Patented June 9, 1953

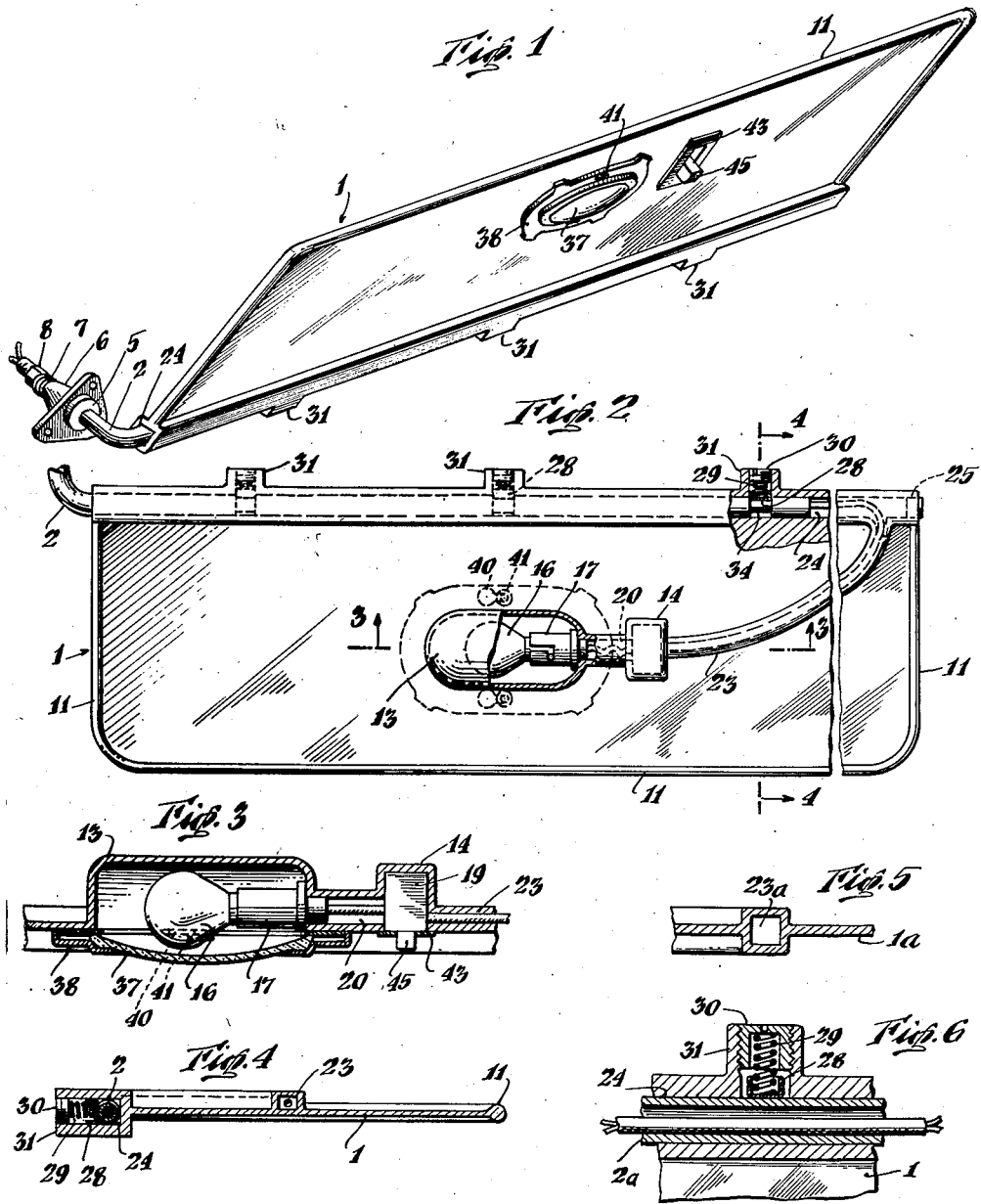

2,641,684

UNITED STATES PATENT OFFICE 2,641,684

VISOR AND LIGHT FOR AUTOMOBILE INTERIOR

Vincent J. Dillon, Jersey City, N. J.

Application June 22, 1951, Serial No. 233,061

1 Claim. (Cl. 240—7.1)

The present invention relates to interior automobile visors and more particularly to an improved visor which embodies an electric light.

Many automobile drivers who do night driving would like to have conveniently available a light that could be readily moved into and out of position for use, while parked, in reading a map, checking sales data, etc. Most automobiles have a light fixed in position on the roof, dash board, or some other portion of the automobile and it is difficult to read by such a light unless a person places the map or other reading matter directly under the light and shifts his position so as to be able to see it. Attempts to solve the above problem have been lacking in various respects; some have required plugging an auxiliary light into a socket but this is objectionable as it requires the use of loose wires and bulb with its socket dangling around the automobile, others have been too unwieldy and expensive to be practical, and still others have required an extensive amount of manipulation to move them to and from a reading position.

The present invention aims to provide a new and improved visor for use at the interior of an automobile which may be used in the usual manner during the daytime for blocking sun from a person's eyes and which may be readily moved to desired position by the driver for reading purposes.

An object of the present invention is to provide a new and improved automobile visor.

Another object of the invention is to provide an improved automobile visor with an electric light.

Another object of the invention is to provide an automobile visor with improved adjusting means.

Another object of the invention is to provide an automobile visor with an electric light which is adapted to prevent objectionable twisting or breaking of electric wires.

Still another object of the invention is to provide an automobile visor which may be readily and inexpensively manufactured from a plastic molding material.

A still further object of the invention is to provide an improved automobile visor of relatively simple and inexpensive construction.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view showing one form of the present invention.

Fig. 2 is a plan view, partly broken away and partly in section, showing the undersurface of the visor illustrated in Fig. 1.

Fig. 3 is a sectional view taken along the line 3—3 of Fig. 2.

Fig. 4 is a sectional view taken along the line 4—4 of Fig. 2.

Fig. 5 is a fragmentary sectional view showing a modified form of the present invention with a wire-receiving recess protruding partially beyond opposite surfaces of the visor; and Fig. 6 is a fragmentary sectional view showing a modified form of the invention which has a supporting member with uninterrupted exterior.

Referring more particularly to Fig. 1, there is shown a preferred embodiment of the visor adapted to be used at the driver's side of an automobile. While the present invention will be described chiefly for use at the left or driver's side of an automobile, it will be understood that it may be readily adapted for use at the right side of an automobile.

The device comprises an opaque body member 1 adjustably secured to a mounting member 2. The mounting member 2 is hollow and is provided with a collar 5, for resting against one end of a hollow member 6 which has a projecting attachment flange adapted to be screwed into position against an overhead portion of the automobile adjacent the driver's position. The body member 1 normally lies more nearly in a horizontal plane but is shown almost upright in Fig. 1 in order to better illustrate its features.

A spring 7 is adapted to pull the hollow supporting member 2 firmly up against one end of the hollow flanged member 6 and to hold it in that position. The spring may be retained in position between suitable washers, by a nut 8. The hollow member or pipe 2 may be rotated in a generally horizontal plane about the axis of its angled end portion which projects up through the hollow retaining member 6, to thus permit swinging the visor portion 1 toward or away from the driver. In addition, the visor 1 may be rotated up and down about the long leg of the hollow member 2, as will be further described.

The visor body portion 1 is preferably of some opaque plastic molding material and has a strengthening and decorative bead 11 extending along its free edge and along opposite end portions. Recessed housings 13, 14, formed integral with the body portion and projecting upwardly from the upper surface of the visor body, are adapted to contain an electric light bulb and socket 16, 17 and a switch 19. The bulb and switch housings 13, 14 are preferably connected together by an integral housing or passageway for containing wires which join the switch 19 with the bulb socket 17. Another passageway 10 23 leads from the switch housing 14 to an edge of the visor, where it communicates with an integral tubular passageway 24 that extends along the visor edge and contains a long leg of the tubular supporting and wire-containing member 15 2. The passageways 20 and 23, as well as the passageway 24 at the edge of the visor, are preferably formed integral with the body of the visor during its manufacture and entirely conceal and protect any wires therein. It will be noted that the passageway 24, does not extend entirely to the end of the visor but communicates with the latter passageway at a location inwardly of the visor, which further serves to completely conceal the wires. The outmost end 25 of the edge passageway 24 may be formed with a closed end during manufacture of the visor or may be subsequently closed by a suitable plug. The passageways and housings may, of course, have cross sections of any suitable shapes.

The visor body portion 1, the bulb and switch housing 13, 14 and the passageways 20, 23 and 24 are preferably all formed of the same plastic molding material. They may be formed in a molding press or may be built up from separate members to form a single integral device. As shown in Figs. 1–4 the wire housings or passageways 20 and 23 project upwardly entirely about the upper surface of the visor body portion but they may project partially above the visor and partially below it, as illustrated by the wire-receiving passageway 23a of Fig. 5.

The long leg of the tubular supporting member 2 extends into and along the edge passageway 24 at the front part of the visor portion 1 and adjustably supports it through the intermediation of shoe members 28, springs 29 fitting into the shoe members, and adjusting screws 30 threaded into hollow portions or bosses 31 which communicate with the interior of the edge passageway 24. The threaded members 30 may be turned in or out in their openings to vary the compression of the springs 29 and the force with which they urge the shoe members 28 against the supporting member 2. The "grip" between the supporting member 2 and the visor body 1 may thus be suitably varied so as to maintain the visor in any position of adjustment.

In instances where it is desirable to provide for lengthwise adjustment of the visor body 1 along the supporting member, the shoe member 28 may fit against a supporting member 2a (Fig. 6) which has a substantially uninterrupted exterior surface. If lengthwise adjustment of the visor is not desired, the shoe members 28 may fit into one or more annular recesses 34 (Fig. 2) in the supporting member adjacent one or more of the shoe members. As shown in Figs. 1 and 2, the device is provided with three adjusting screws 30 and springs along its length, but the invention is not limited to this exact number as more or less than three may be utilized. The construction retains the visor body in adjusted position with respect to the supporting member 2 without the necessity of providing any flat or corrugated portions around the circumference of the tubular member 2.

The supporting member 2 is shown terminating short of the edge passageway 24 so that electric wires emerging from its end extend along the passageway a distance before reaching the connecting passageway 23. This provides a "free" length of wire which may absorb or take up twist of the wires during rotation of the visor body 1 about the supporting member 2. This space between the end of the supporting member 2 and the transverse wire passageway 23 may also contain a wire somewhat longer than the distance between the end of the supporting member and the transverse passageway, in order to provide slack for accommodating lengthwise adjustment of the visor body with respect to the supporting member 2.

After a bulb socket 17 and bulb 16 is placed within the housing 13, any suitable cover plate may be placed over the downwardly facing opening of the recess 13. This cover may comprise a transparent or translucent glass or plastic member 37 carried by a frame 38 having recesses 40 adapted to fit over projections 41 carried by the visor member 1. Any other suitable type of cover and attachment means may be utilized.

The switch 19 may be retained in the switch housing 14 in any suitable manner; for example, it may be force-fitted into the housing so that a cover plate 43 carried thereby overlies the downwardly facing opening of the switch housing. An operating projection 45 of the switch may extend through an opening in the switch cover plate 43. Here again, any suitable cover member 43 may be utilized and any suitable means may be employed for retaining the switch 19 in position within the integral housing 14 of the visor member 1.

The connecting wires within the connecting passageways 20, 23 and 24 are completely enclosed and concealed so that they cannot be readily tampered with or have their insulating coverings worn away. The wires extend through the long leg of the supporting member 2 and may emerge from the end of its short connecting leg. One wire is preferably grounded to the supporting member 2 or some other adjacent metal portion of the automobile and another extends to the automobile battery, either directly or through a suitable fuse or terminal connection. When the switch 45 is in "off" position, the wires are disconnected from the bulb. When the switch is moved to "on" position the wires connect the bulb with the battery and hence it may supply illumination.

It will be seen that the present invention provides a new and improved visor device for an automobile interior which may be readily swung to any of numerous desired positions for use by the driver in reading maps, data sheets, etc. The visor body portion is preferably formed of some suitably colored plastic molding material and is adjustably retained on its supporting member by a relatively simple and inexpensive gripping means. The housings and passageways for the bulb, switch and wires are all integral with the visor body and the connecting wires are completely concealed and protected. The visor may be adjusted circumferentially of the supporting member, or if desired, longitudinally thereof.

The openings from the bulb and switch housings face downwardly from the visor body so that the switch is always conveniently available and so that light from a bulb may shine directly downwardly; it is not necessary to invert the visor or any portion of it before being able to direct the light onto a desired location. A portion of the wiring is housed within the edge passageway in free or unrestrained manner so that it tends to absorb twisting of the visor body about its supporting member and obviate objectionable stresses or strains which might otherwise be imposed on the wiring. This unrestrained wire portion may be sufficiently long to provide for longitudinal adjustment of the visor body along its supporting member.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

An automobile visor comprising a sheet of material having a tubular passageway extending along one edge thereof and a bulb housing projecting above its upper surface at a location spaced from said tubular passageway and a wire-receiving passageway having one end communicating with said housing and another end communicating with said tubular passageway, and means for supporting the visor for adjustment about said edge comprising a tubular member in and extending along a portion only of the length of said tubular passageway having an open end in said tubular passageway spaced from an end of the tubular passageway and from said other end of the wire-receiving passageway, said tubular passageway between the open end of the tubular member and said other end of the wire-receiving passageway being adapted to freely contain a length of electric wiring to facilitate twisting of the wiring upon adjustment of the sheet with respect to said tubular member.

VINCENT J. DILLON.

References Cited in the file of this patent

UNITED STATES PATENTS

| Number | Name | Date |
|---|---|---|
| 1,653,208 | Gray | Dec. 20, 1927 |
| 1,786,011 | Groenenstein | Dec. 23, 1930 |
| 2,073,375 | Laxter | Mar. 9, 1937 |

FOREIGN PATENTS

| Number | Country | Date |
|---|---|---|
| 564,860 | England | Oct. 17, 1944 |